US007991670B1

(12) United States Patent
 Ebens

(10) Patent No.: US 7,991,670 B1
(45) Date of Patent: Aug. 2, 2011

(54) SYSTEM AND METHOD FOR PROVIDING A VOLATILITY ARBITRAGE INDEX

(75) Inventor: Heiko Ebens, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 710 days.

(21) Appl. No.: 11/870,834

(22) Filed: Oct. 11, 2007

Related U.S. Application Data

(60) Provisional application No. 60/870,305, filed on Dec. 15, 2006.

(51) Int. Cl.
 *G06Q 40/00* (2006.01)
(52) U.S. Cl. ......................................... 705/36 R; 705/35
(58) Field of Classification Search ................ 705/36 R, 705/35
 See application file for complete search history.

(56) References Cited

U.S. PATENT DOCUMENTS

| 7,747,514 | B2 * | 6/2010 | Bloom | 705/37 |
| 2003/0220865 | A1 * | 11/2003 | Lutnick | 705/37 |
| 2006/0224494 | A1 * | 10/2006 | Pinkava | 705/37 |
| 2006/0253370 | A1 * | 11/2006 | Feuser et al. | 705/37 |
| 2007/0250454 | A1 * | 10/2007 | Bloom | 705/70 |
| 2008/0154790 | A1 * | 6/2008 | Hiatt | 705/36 R |

OTHER PUBLICATIONS

Richard Croft. (May 26, 2004). The new S&P 500 Variance futures have a few kinks: :[National Edition]. National Post,p. IN3. Retrieved Mar. 31, 2011, from Banking Information Source.*

Merrill Lynch Global Equity Volatility Insights; Global Securities Research & Economics Group; RC#40627004; Equity Derivatives Strategy Department; 14 pages, Sep. 27, 2005.
CBOE, CBSX, & CFE Press Releases; *CBOE to List Options on the CBOE Volatility Index (VIX) Friday*, Feb. 24, 2006; 1 page, Jan. 11, 2006.
Merrill Lynch Global Equity Volatility Insights; *Equity Volatility Trends and Global Derivative Trading Ideas*; 18 pages, Apr. 4, 2006.
Merrill Lynch Global Equity Volatility Insights; *Equity Volatility Trends and Global Derivative Trading Ideas*; 25 pages, Nov. 21, 2006.
Merrill Lynch Hedge Fund Replication; *Merrill Lynch Equity Volatility Arbitrage Index*; 7 pages, Feb. 6, 2007.
Emma Trincal; Lipper HedgeWorld; *Who's Watching Your Back Office?*; 2 pages, Jun. 25, 2007.

(Continued)

*Primary Examiner* — Narayanswamy Subramanian
*Assistant Examiner* — Kito R Robinson
(74) *Attorney, Agent, or Firm* — Michael Springs

(57) ABSTRACT

A system comprises a memory operable to store a first closing value of an index for a first day, wherein the index is based at least in part on a cash account and a variance future. The system further comprises a processor communicatively coupled to the memory and operable to determine a first settlement value of a variance future for the first day and to determine a second settlement value of the variance future for a second day. The processor is further operable to determine an increase of cash in the cash account from the first day to the second day, wherein the determination is based at least in part on an interest rate. The processor is further operable to determine a second closing value of the index for the second day, wherein the determination is based at least in part on the determined increase of cash in the cash account, the first settlement value, and the second settlement value. The processor is further operable to store the second closing value in the memory.

18 Claims, 3 Drawing Sheets

OTHER PUBLICATIONS

Barclays Capital; *Equity Volatility—an Investment Tool in the Hunt for Absolute Returns*; 2 pages, 2007.
Global Markets Research; DBIQ Index Guide; *DBIQ ImpAct Dollar Equity Volatility Index Quick*; 7 pages, Aug. 22, 2007.
Standard & Poor's; *S&P 500 Volatility Arbitrage Index*; 2 pages, Dec. 21, 2007.
Standard & Poor's; *S&P 500 Volatility Arbitrage Index; Index Methodology*; 10 pages, Jan. 2008.

* cited by examiner

US 7,991,670 B1

SYSTEM AND METHOD FOR PROVIDING A VOLATILITY ARBITRAGE INDEX

RELATED APPLICATION

This patent application claims priority to Patent Application Ser. No. 60/870,305, filed Dec. 15, 2006, entitled System and Method for Managing Trading Based on Volatility Arbitrage Index.

TECHNICAL FIELD OF THE INVENTION

The present invention relates generally to electronic trading and more specifically to a system and method for providing a volatility arbitrage index.

BACKGROUND OF THE INVENTION

Traditional trading systems allow traders to pursue various investment schemes, including mutual funds and hedge funds. Some traders perceive hedge funds as providing greater returns than other types of investments. However, because hedge funds are actively managed, hedge funds are generally associated with higher fees than other types of investments. In addition, investments in hedge funds are generally not as liquid as investments in other types of assets.

SUMMARY OF THE INVENTION

In accordance with the present invention, the disadvantages and problems associated with prior trading systems have been substantially reduced or eliminated.

In some embodiments, a system comprises a memory operable to store a first closing value of an index for a first day, wherein the index is based at least in part on a cash account and a variance future. The system further comprises a processor communicatively coupled to the memory and operable to determine a first settlement value of a variance future for the first day and to determine a second settlement value of the variance future for a second day. The processor is further operable to determine an increase of cash in the cash account from the first day to the second day, wherein the determination is based at least in part on an interest rate. The processor is further operable to determine a second closing value of the index for the second day, wherein the determination is based at least in part on the determined increase of cash in the cash account, the first settlement value, and the second settlement value. The processor is further operable to store the second closing value in the memory.

The invention has several technical advantages. Various embodiments of the invention may have none, some, or all of these advantages. One advantage is that a trading system provides a target index that emulates the performance of an ongoing collateralized short position in one or more variance futures. By tracking a short position in variance futures, target index may exploit the premium at which the implied volatility of options are traded in relation to their fair value.

Another advantage is that the trading system may provide a target index fund that tracks the performance of the target index. The target index fund may hold short positions in variance futures as well as cash collateral that accrues interest. The trading system may periodically rebalance the cash collateral and short variance futures in order to take into account gains or losses on the short variance futures. As a passively managed fund that tracks target index, target index fund may provide favorable returns with greater liquidity and transparency than hedge funds Other advantages of the present invention will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
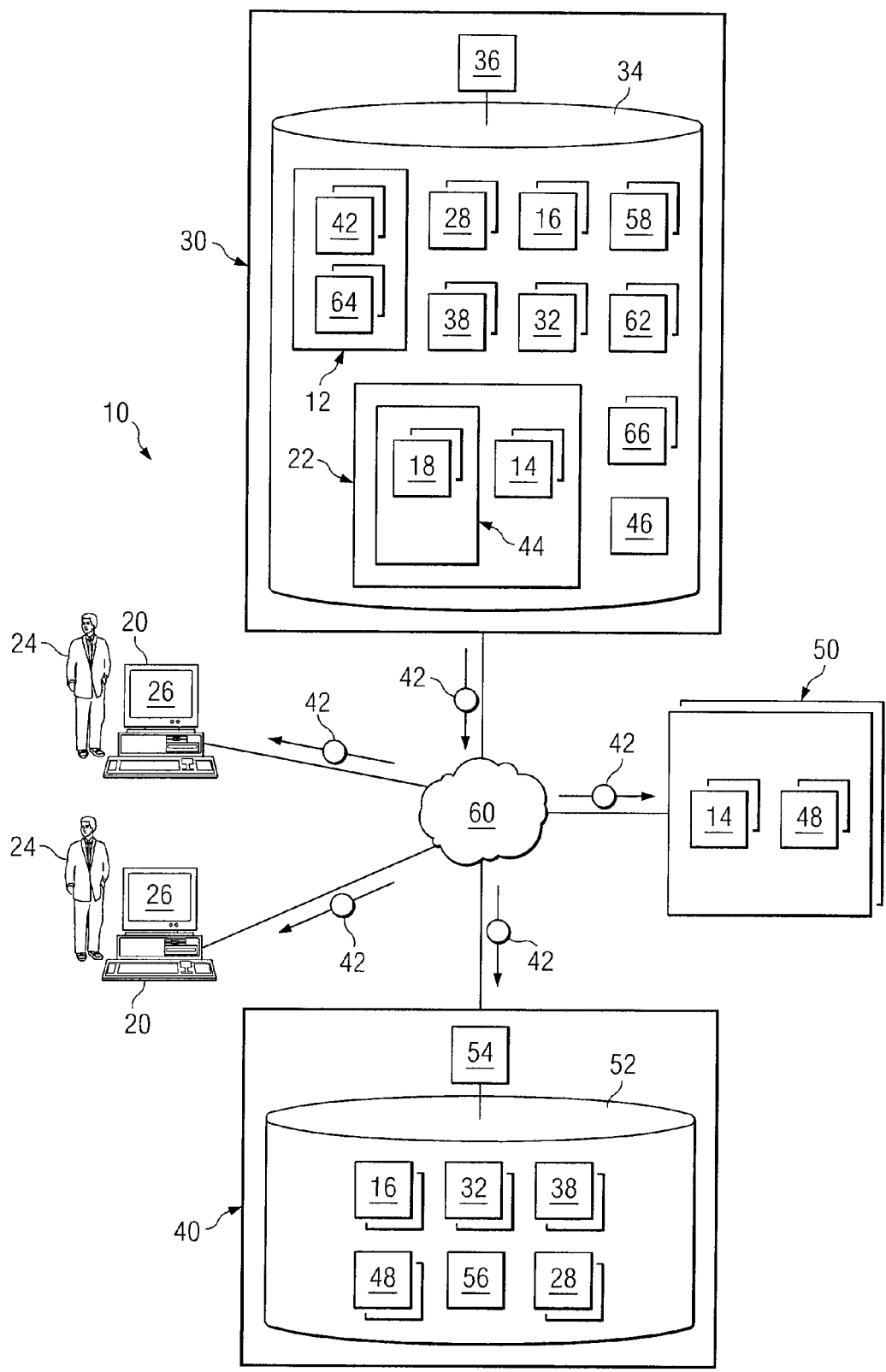
FIG. 1 illustrates a trading system, according to certain embodiments.

FIG. 1 illustrates a trading system 10, according to certain embodiments. Trading system 10 may comprise one or more clients 20, an index server 30, one or more market data servers 40, and one or more market centers 50 communicatively coupled by one or more networks 60.

Trading system 10 is operable to provide a target index 12 that emulates the performance of an ongoing collateralized short position in one or more variance futures 14. In some embodiments, variance futures 14 are futures contracts that are predicated on the variance of a market index 16. Variance is generally a measure of the dispersion of returns. When applied to a particular market index 16 such as, for example, the S&P 500 Index, variance is a measure of the "volatility" of the particular market index 16.

In some embodiments, market demand for options on market index 16 causes the implied volatility of the options to trade at a premium to their fair value. Trading system 10 may exploit this premium by providing target index 12 that tracks the performance of a long position in cash 18 that accrues interest and a short position in variance futures 14. At any given time, the variance tracked by target index 12 may be calculated as the difference between (1) a first value derived from the implied volatility of market index 16 on a particular date and (2) a second value equal to the realized volatility of market index 16 for a period starting on the particular date and ending after some period of time (e.g., three months, six months, etc.). Thus, target index 12 may rise to the extent that such realized volatility is less than such implied volatility and may fall to the extent that such realized volatility is greater than such implied volatility.

In conjunction with providing target index 12, trading system 10 may provide target index fund 22. In some embodiments, target index fund 22 represents a liquid and tradable asset that is available to the trading public. Target index fund 22 may be a passively managed fund that tracks target index 12 by emulating the performance of an ongoing collateralized short position in variance futures 14. Target index fund 22 may provide favorable returns with greater liquidity and transparency than hedge funds.

According to certain embodiments, variance future 14 may be an independently calculated futures contract that is quoted in one or more market centers 50 and that is designed to measure the variance of a particular market index 16 over the period of the futures contract. Variance future 14 may be a three-month futures contract, a six-month futures contract, or a futures contract based on any suitable time period. In some embodiments, variance future 14 may be a CBOE S&P 500 Three-Month Variance Future, a FTSE 100 One-Month Variance Future, and/or any suitable variance future 14.

Variance may be calculated as the average squared deviation of each number from its mean. Thus, variance represents a measure of how spread out a distribution is. When applied to market index 16, variance may be used as a measure of the volatility of market index 16.

Market index 16 is a measure of the market value and/or performance of the particular investment instruments that underlie market index 16. Market index 16 may be predicated on any suitable investment instruments such as, for example, equities, debt, currencies, commodities, derivatives, and/or any suitable trading product. In some embodiments, market index 16 may be the S&P 500 Index, the FTSE 100 Index, the Dow Jones-AIG Commodities Index, the Dow Jones Corporate Bond Index, and/or any suitable index.

As explained above, trading system 10 comprises one or more clients 20. Client 20 represents any suitable local or remote end-user device that may be used by traders 24 to access one or more elements of trading system 10, such as index server 30. Trader 24 may use client 20 to submit deposits, make withdrawals, request information, and/or communicate with various components of trading system 10. In some embodiments, trader 24 may use client 20 to view target index 12 and/or to invest in funds that are managed by index server 30. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of trading system 10. Client 20 may also comprise any suitable user interface such as a display, microphone, keyboard, or any other appropriate terminal equipment according to particular configurations and arrangements. It will be understood that trading system 10 may comprise any number and combination of clients 20. In some embodiments, client 20 may comprise a graphical user interface (GUI) 26.

GUI 26 is generally operable to tailor and filter data presented to trader 24. GUI 26 may provide trader 24 with an efficient and user-friendly presentation of trading orders, market data 28, and/or other suitable information. GUI 26 may comprise a plurality of displays having interactive fields, pull-down lists, and buttons operated by trader 24. In one example, GUI 26 presents relevant market data 28 to trader 24 and conceals the remaining information to reduce visual clutter. Then, upon receiving a request from trader 24, GUI 26 expands the visual representation of market data 28 to display account information, market information, and/or other suitable information. GUI 26 may include multiple levels of abstraction including groupings and boundaries. It should be understood that the term graphical user interface may be used in the singular or in the plural to describe one or more graphical user interfaces and each of the displays of a particular graphical user interface.

Although clients 20 are described herein as being used by "traders", it should be understood that the term "trader" is meant to broadly apply to any user of trading system 10, whether that user is an agent acting on behalf of a principal, an individual, a legal entity (such as a corporation), or any machine or mechanism that is capable of participating in transactions in trading system 10.

Trader 24 may use client 20 to communicate with index server 30. Index server 30 is generally operable to calculate target index 12, determine returns associated with variance futures 14, monitor one or more interest rates 32, and manage target index fund 22. Index server 30 may comprise any suitable combination of hardware and/or software implemented in one or more modules to provide the described functions and operations. In some embodiments, index server 30 may comprise a general-purpose personal computer (PC), a Macintosh, a workstation, a Unix-based computer, a server computer, or any suitable processing device. In some embodiments, the functions and operations described above may be performed by a pool of multiple index servers 30. A particular index server 30 may comprise an index memory 34 and an index processor 36.

Index memory 34 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as market data 28. Although FIG. 1 illustrates index memory 34 as internal to index server 30, it should be understood that index memory 34 may be internal or external to index server 30, depending on particular implementations. Also, index memory 34 may be separate from or integral to other memory devices to achieve any suitable arrangement of memory devices for use in trading system 10.

Index memory 34 is generally operable to store current and/or historical values of cash 18, interest rate 32, variance future settlement value 38, and target index closing value 42. Cash 18 represents the actual or hypothetical cash collateral position in target index 12. Cash 18 may increase with the accrual of actual or hypothetical interest according to interest rate 32. The value of cash 18 associated with target index 12 may be reset on each final settlement day of variance future 14 to equal target index closing value 42 on that final settlement day. This reset mechanism may effectively adjust cash 18 associated with target index 12 to take into account gains or losses, as of the final settlement day, on the short position of target index 12 in variance futures 14.

In some embodiments, index memory 34 stores interest rate 32. Cash 18, which serves as collateral for short positions of target index 12 in variance futures 14, may be held in an interest-bearing cash account 44. Interest rate 32 may be the rate at which the particular cash account 44 yields interest. Interest rate 32 may be the British Bankers Association (BBA) LIBOR rate, the federal funds rate, and/or any suitable lending rate. Index server 30 is operable to determine interest rate 32 from market data 28 received from market data server 40. Index server 30 may store interest rate 32 in index memory 34.

Index memory 34 is further operable to store current and/or historical variance future settlement values 38. Variance future settlement value 38 refers to the settlement value of variance future 14 at the close of a given trading day. In some embodiments, market center 50 and/or market data server 40 calculates variance future settlement value 38 at the close of each trading day for the purpose of making margin calculations. In some embodiments, market center 50 and/or market data server 40 calculates variance future settlement value 38 as an average of one or more variance future transaction prices immediately before the close of trading. In other embodiments, market center 50 and/or market data server 40 calculates variance future settlement value 38 as an average of indicative quotes that are associated with variance future 14 and that are obtained from traders 24 at the close of trading. Formulas for calculating variance future settlement value 38 may vary depending on the particular type of variance future 14 and/or on the particular market center 50. In some embodiments, variance future settlement value 38 may depend upon how active trading of the variance future 14 was at the close of trading.

Target index closing value 42 refers to the value of target index 12 as calculated and reported by index server 30 at the close of trading. For a given day, target index closing value 42 may be calculated based at least in part on cash 18, interest rate 32, and variance future settlement value 38. In some embodiments, index server 30 may calculate target index closing value 42 at the close of business on each index calculation day. An "index calculation day" refers to a day on which market centers 50 and/or banks are open for business. In some embodiments, target index 12 may be the Merrill Lynch Volatility Arbitrage Index. In other embodiments, target index 12 may be any suitable type of index that represents the performance of an ongoing collateralized short position in variance futures 14.

Index memory 34 is further operable to store index logic 46. Index logic 46 generally comprises rules, algorithms, code, tables, and/or other suitable instructions for updating target index 12 and managing target index fund 22.

Index memory 34 is communicatively coupled to index processor 36. Index processor 36 is generally operable to execute index logic 46 stored in index memory 34 to calculate target index 12 and to manage target index fund 22. Index processor 36 may comprise any suitable combination of hardware and software implemented in one or more modules to provide the described function or operation.

Index server 30 may be communicatively coupled to one or more market centers 50 via network 60. Market center 50 is generally operable to receive and execute trading orders and transmit trade confirmations to index server 30 and/or traders 24. Market center 50 is further operable to transmit trading data 48 to market data server 40. Trading data 48 may comprise information regarding trading activities in market center 50. In particular, trading data 48 may comprise information regarding best bid prices, best offer prices, trading volumes, volatility, and/or any other suitable information regarding trading activity in market center 50. In some embodiments, trading data 48 represents raw and/or partially-processed data regarding conditions in market center 50.

Market centers 50 may comprise all manner of order execution venues including exchanges, Electronic Communication Networks (ECNs), Alternative Trading Systems (ATSs), market makers, or any other suitable market participants. Each market center 50 may maintain a bid and offer price for at least one investment instrument by standing ready, willing, and able to buy or sell that investment instrument at publicly quoted prices, also referred to as market center 50 prices. Different market centers 50 may provide different market center prices for particular investment instruments. For example, a particular market center 50 may offer a particular bid price and/or offer price for a particular investment instrument, while another market center 50 may offer a different bid price and/or offer price for the same investment instrument. Examples of market center 50 include, but are not limited to, the New York Stock Exchange, the London Stock Exchange, the Chicago Mercantile Exchange, the Tokyo Commodity Exchange, and/or any suitable order execution venue.

Market center 50 may be communicatively coupled via network 60 to market data server 40. Market data server 40 is generally operable to receive and process trading data 48 from market center 50. Market data server 40 may process trading data 48 to generate market data 28. Market data 28 may comprise current and/or historical information regarding any suitable index, financial instrument, mutual fund, hedge fund, exchange traded fund ("ETF"), interest rate 32, investment instrument, trader 24, and/or any suitable number and combination of indicators regarding trading system 10. In particular, market data 28 may comprise information regarding interest rate 32, variance future settlement value 38, and market index 16. In some embodiments, market data server 40 may be operated by a financial news service organization such as, for example, Bloomberg L.P. or Reuters Group PLC. In other embodiments, market data server 40 may be operated by a market maker, brokerage firm, bank, market center 50, and/or any suitable financial services entity.

Market data server 40 may comprise any suitable combination of hardware and/or software implemented in one or more modules to provide the described functions and operations. In some embodiments, market data server 40 may comprise a general-purpose personal computer (PC), a Macintosh, a workstation, a Unix-based computer, a server computer, or any suitable processing device. In some embodiments, the functions and operations described above may be performed by a pool of multiple market data servers 40. A particular market data server 40 may comprise a market data memory 52 and a market data processor 54.

Market data memory 52 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 1 illustrates market data memory 52 as internal to market data server 40, it should be understood that market data memory 52 may be internal or external to market data server 40, depending on particular implementations. Also, market data memory 52 may be separate from or integral to other memory devices to achieve any suitable arrangement of memory devices for use in trading system 10.

Market data memory 52 is generally operable to store trading data 48, market data 28, and market data logic 56. Market data logic 56 generally comprises rules, algorithms, code, tables, and/or other suitable instructions for generating market data 28 based at least in part on trading data 48.

Market data memory 52 may be communicatively coupled to market data processor 54, which is operable to execute market data logic 56. Market data processor 54 comprises any suitable combination of hardware and software implemented in one or more modules to provide the described function or operation.

As explained above, clients 20, index server 30, market data servers 40, and market centers 50 may be communicatively coupled via one or more networks 60. Network 60 may represent any number and combination of wireline and/or wireless networks suitable for data transmission. Network 60 may, for example, communicate internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations.

It should be understood that the internal structure of trading system 10 and the servers, processors, and memory devices associated therewith is malleable and can be readily changed, modified, rearranged, or reconfigured to achieve the intended operations of trading system 10.

In operation, index server 30 is operable to periodically (e.g., hourly, daily, weekly, etc.) update target index 12. On a given index calculation day, index server 30 may determine a cash return 58 based at least in part on interest rate 32 and the value of cash account 44 from the immediately preceding index calculation day. Index server 30 may further identify variance future settlement value 38 for the current day and variance future settlement value 38 for the immediately preceding index calculation day. Based at least in part on the identified variance future settlement values 38, index server 30 may determine a return associated with variance futures 14 of target index 12. This return may be referred to as variance return 62. Index server 30 may then determine target index closing value 42 for the given index calculation day based at least in part on the determined cash return 58 and the determined variance return 62.

In some embodiments, index server 30 may transmit the determined target index closing value 42 to market center 50 and/or market data server 40. Index server 30 may cause clients 20 associated with traders 24 to display the determined target index closing value 42.

Target index 12 may be associated with target index fund 22 that emulates the performance of target index 12. In some embodiments, target index fund 22 comprises cash account 44 and short positions in variance futures 14. On each final settlement day of variance future 14, the assets of target index fund 22 may be re-allocated between cash account 44 and the short positions in variance futures 14. The "final settlement day" of variance future 14 refers to the day on which variance future 14 expires. Thus, if variance future 14 is a three-month variance future 14 such as, for example, the CBOE S&P 500 Three-Month Variance Future, then the final settlement day may be the third Friday of each March, June, September, and December.

On a particular final settlement day, index server 30 may re-allocate the assets of target index fund 22 such that the value of cash 18 in cash account 44 equals target index closing value 42 for the particular final settlement day. Target index fund 22 may thereby periodically take into account gains or losses on the short positions in variance futures 14 associated with target index 12. In some embodiments, index server 30 may reconfigure the short variance futures 14 in target index fund 22 such that the value of the short variance futures 14 equals the value of cash 18 in cash account 44.

Figure 2:
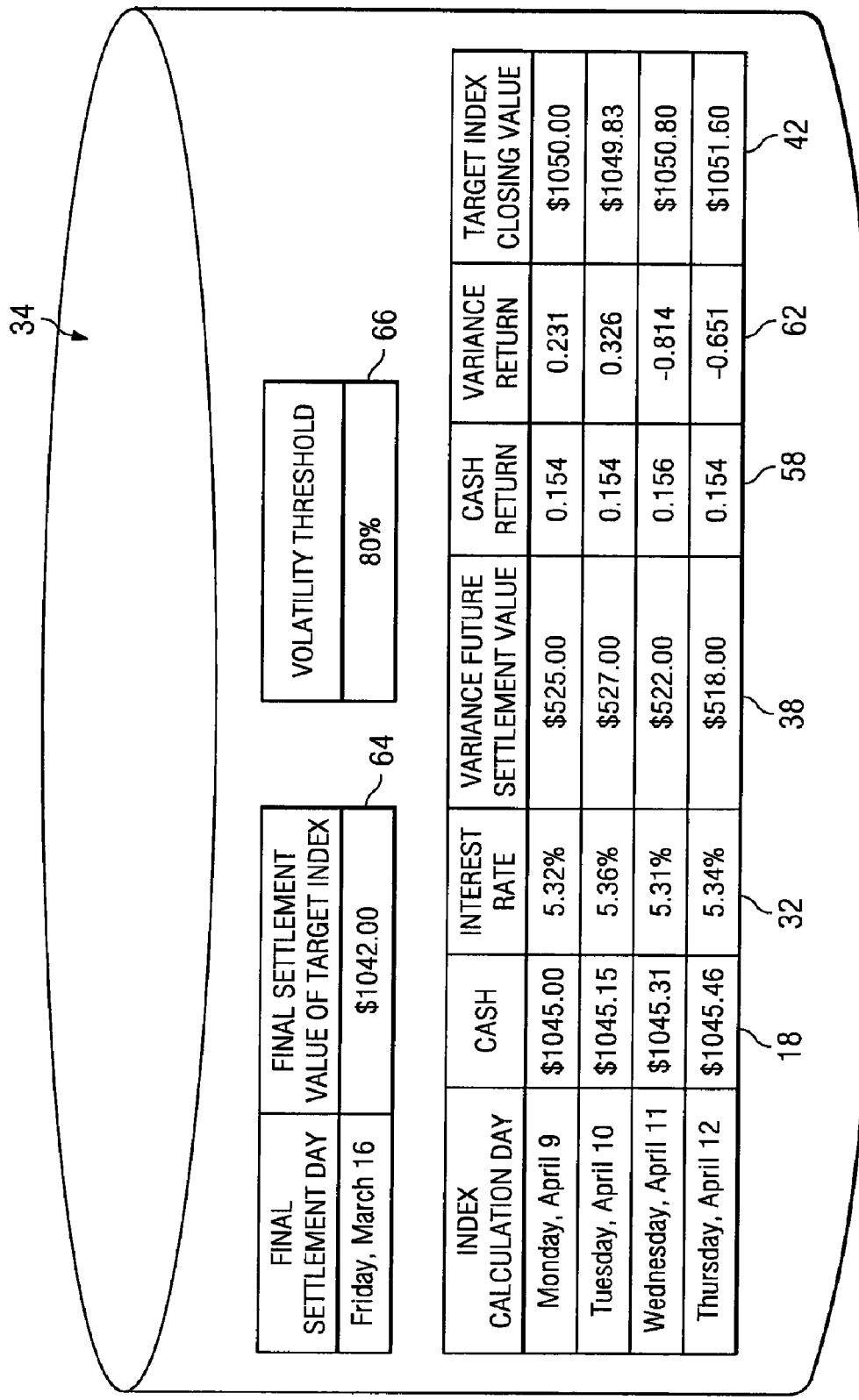
FIG. 2 illustrates example data for updating a target index, according to certain embodiments.

On each index calculation day, index server 30 may determine target index closing value 42. FIG. 2 illustrates example data for updating target index 12, according to certain embodiments. The example data may be stored in index memory 34. Index server 30 may determine target index closing value 42 based at least in part on cash return 58 and variance return 62.

Cash return 58 may be based at least in part on interest rate 32. Index memory 34 is operable to store current and/or historical values of interest rate 32. As explained above, interest rate 32 refers to the rate at which cash 18 associated with target index 12 accrues interest. In some embodiments, interest rate 32 may be the BBA Overnight LIBOR rate, the federal funds rate, and/or any suitable lending rate. According to certain embodiments, cash 18 may serve as collateral for the short positions of target index 12 in variance futures 14 and may be held in cash account 44 that yields interest according to interest rate 32. On a given day, index server 30 may determine the current value of interest rate 32 based at least in part on market data 28 from market data server 40. For example, on Tuesday, April 10, index server 30 may determine from market data 28 that the current interest rate 32 is 5.36%. Index server 30 may store the determined interest rate 32 in index memory 34.

Index memory 34 is further operable to store daily values of cash 18. Cash 18 associated with target index 12 serves as collateral for the ongoing short positions of target index 12 in variance futures 14. Cash 18 may be actually or hypothetically held in cash account 44 that yields interest according to interest rate 32. Index server 30 may determine the current value of cash 18 according to the following formula:

$$cash_c = cash_p \times (1 + \text{interest rate} \times D/360)$$

In the foregoing formula, "$cash_c$" refers to the current value of cash 18 associated with target index 12 and "$cash_p$" refers to the value of cash 18 from the immediately preceding index calculation date. "Interest rate" may refer to interest rate 32 at the close of the immediately preceding index calculation day. "D" may refer to the actual number of days from (but excluding) the immediately preceding index calculation day to (and including) the current index calculation day. Although the foregoing formula uses a convention of 360 days (e.g., D/360), it should be understood that "cash" may be calculated using a convention of 365 days (e.g., D/365) and/or any suitable number of days.

In certain embodiments, when target index 12 is initiated, an actual or hypothetical cash position is associated with target index 12. For example, if target index 12 is the Merrill Lynch Equity Volatility Arbitrage Index, then target index 12 was established on Feb. 6, 2007 with values of target index 12 reported from Mar. 17, 1989 (the "Initiation Date") based on an initial cash collateral position of $100.00.

In conjunction with determining the daily value of cash 18 associated with target index 12, index server 30 may determine the cash return 58 associated with target index 12. Cash return 58 may be determined according to the following formula:

$$Return_c = cash_p \times \text{interest rate} \times D/360$$

In the foregoing formula, "$Return_c$" refers to the current value of cash return 58 for target index 12. Thus, cash return 58 refers to the daily interest earned on cash 18 associated with target index 12. Although the foregoing formula uses a convention of 360 days (e.g., D/360), it should be understood that "$Return_c$" may be calculated using a convention of 365 days (e.g., D/365) and/or any suitable number of days.

An example illustrates certain embodiments. On Monday, April 9, index server 30 determines that interest rate 32 is 5.32% and that the current value of cash 18 associated with target index 12 is $1,045.00. On Tuesday, April 10, index server 30 determines the daily cash return 58 by multiplying $1,045.00 by 5.32% and by 1/360. Index server 30 thereby determines that cash return 58 for Tuesday, April 10, is 0.154. By adding the determined value of cash return 58 (0.154) to the value of cash 18 from the immediately preceding index calculation day ($1,045.00), index server 30 determines that the value of cash 18 for target index 12 on Tuesday, April 10, is $1,045.15. Index server 30 may store the determined value of cash return 58 and the determined value of cash 18 in index memory 34.

In some embodiments, if the current index calculation day is the issue date of notes associated with target index 12, index server 30 may be configured to set the value of cash 18 to be equal to target index closing value 42 on the immediately preceding index calculation day. According to certain embodiments, if the immediately preceding index calculation day is a final settlement day of variance future 14, then index server 30 may be configured to set the value of cash 18 to be equal to target index closing value 42 on the final settlement day.

Index memory 34 is further operable to store variance future settlement values 38. Variance future settlement value 38 may represent an average of one or more variance future transaction prices immediately before the close of trading. Index server 30 may determine variance future settlement value 38 based at least in part on market data 28 from market data server 40. For example, at the close of trading on Tuesday, April 10, index server 30 may determine from market data 28 that variance future settlement value 38 is $527.00. Index server 30 may store the determined variance future settlement value 38 in index memory 34.

Index memory 34 is further operable to store final settlement values 64 of target index 12. Final settlement value 64 of target index 12 refers to target index closing value 42 on the most recent final settlement day. In the present example, variance futures 14 are three-month variance futures 14 that are configured to expire on the third Friday of each March, June, September, and December. Accordingly, index memory 34 stores final settlement value 64 as of Friday, March 16—the most recent final settlement day. In this example, final settlement value 64 is $1,042.00.

Index server 30 is operable to determine variance returns 62 based at least in part on final settlement value 64 of target index 12 and on variance future settlement values 38. Index server 30 may determine variance return 62 according to the following formula:

$$Return_v = M \times (F_c - F_p)/(V_t \times 100)^2$$

In the foregoing formula, $Return_v$ refers to variance return 62 for the current day. "$F_c$" refers to variance future settlement value 38 for the current day and "$F_p$" refers to variance future settlement value 38 for the immediately preceding index calculation day. "M" refers to final settlement value 64 of target index 12 for the most recent final settlement day.

In the foregoing formula, "$V_t$" represents a volatility threshold 66 stored in index memory 34. Volatility threshold 66 may be configured such that, if the realized volatility of variance future 14 exceeds volatility threshold 66, then more than the investment notional associated with target index 12 will be lost. According to certain embodiments, volatility threshold 66 may be based at least in part on historical values of realized volatility of variance future 14. For example, if variance future 14 is the S&P 500 Three-Month Variance Future, historical data shows that the highest realized volatility of variance future 14 between 1928 and 2006 was 69.9%. Based at least in part on this observation, volatility threshold 66 may be set as 80%. Thus, according to certain embodiments, volatility threshold 66 may be set equal to or higher (e.g., 1%-20% higher) than the highest realized volatility of variance future 14 during a configurable historical period. Referring to the foregoing formula for determining variance return 62, if volatility threshold 66 is set, for example, to 80%, then the formula becomes:

$$Return_v = M \times (F_c - F_p)/(0.80 \times 100)^2 = M \times (F_c - F_p)/6,400$$

Accordingly, referring to the example illustrated in FIG. 2, index server 30 may determine that, on Tuesday, April 10, the current variance return 62 is 0.326 (i.e., $1,042.00×($527.00−$525.00)/6,400). Index server 30 may store the current variance return 62 in index memory 34. Although volatility threshold 66 in the foregoing example is 80%, it should be understood that volatility threshold 66 may be any suitable value.

In the foregoing example, "$F_p$" equals the variance future settlement value 38 for the immediately preceding index calculation day. In some embodiments, on the index calculation day immediately following a final settlement day of variance future 14, "$F_p$" equals the market value on such final settlement day of variance future 14 (e.g., S&P 500 Three-Month Variance Future) for the new futures contract period (e.g., three-month period) beginning on such index calculation day.

According to certain embodiments, index server 30 may determine the current target index closing value 42 based at least in part on the current cash return 58, the current variance return 62, and target index closing value 42 from the immediately preceding index calculation day. In some embodiments, index server 30 may determine the current target index closing value 42 according to the following formula:

$$I_c = I_p + Return_c - Return_v$$

In the foregoing formula, "$I_c$" refers to target index closing value 42 on the current index calculation day and "$I_p$" refers to target index closing value 42 for the immediately preceding index calculation day. As explained above, "$Return_c$" refers to the current value of cash return 58 for target index 12. "$Return_v$" refers to variance return 62 for the current day.

In the present example, index server 30 determines that, for April 10, "$Return_c$" is 0.154 and "$Return_v$" is 0.326. If the current day is April 10, index server 30 may scan index memory 34 to determine that "$I_p$"—target index closing value 42 for April 9—is $1,050.00. According to the foregoing formula, index server 30 may determine that "$I_c$"—target index closing value 42 for April 10—is $1,049.83 (i.e., $1,050.00+0.154−0.326).

The foregoing example includes sample values of variance future 14. It should be understood that target index 12 may be associated with and suitable type and/or combination of variance future 14.

In some embodiments, variance future 14 is a three-month futures contract. In such embodiments, a three-month variance future 14 is associated with the realized variance of market index 16 over a given three-month period. In order to calculate the realized variance of one of these three-month periods, the accumulated continuously compounded daily returns of market index 16 from the first day of the particular three-month period through the last day of such period are annualized on the basis of a 252 business day year in accordance with the following formula:

$$Variance = 252 \times \left( \sum_{i=1}^{N_a-1} R_i^2 / (N_e - 1) \right)$$

Where:
$R_i = \ln(P_{i+1}/P_i)$=The continuously compounded daily return of market index 16 from $P_i$ to $P_{i+1}$.
$P_{i+1}$=The final value of market index 16 used to calculate the daily return of market index 16.
$P_i$=The initial value of market index 16 used to calculate the daily return of market index 16.
For purposes of calculating the three-month realized variance, the Special
Opening Quotation ("SOQ") of market index 16 may be used on the first and last day of the three-month period. All other values in the series may be closing values of market index 16.
$N_e$=Number of expected market index values needed to calculate daily returns during the three-month period. The total number of daily returns expected during the three-month period may be $N_e-1$. Generally, $N_e$ will equal $N_a$ (as defined below). However, if one or more market disruption events occurs during the three-month period, the actual number of market index values may be less than the expected number of market index values by an amount equal to the number of market disruption events that occurred during the three-month period. The total number of actual daily returns during the three-month period may be $N_a-1$. Therefore, for purposes of the above formula, $N_a$ may be substituted for $N_e$.

$N_a$=The actual number of market index values used to calculate daily returns during the three-month period.

On any given index calculation day, index server 30 may determine the current value of variance associated with market index 16 for the given three-month period based at least in part on the closing value of the next expiring variance future 14 on the current day. As explained above, variance future 14 is an independently calculated futures contract that is quoted in one or more market centers 50 and that is designed to measure the variance of market index 16 over the period of the futures contract. Variance futures 14 may be quoted in terms of variance points (e.g., 10,000 multiplied by the variance calculated in accordance with the formula above). In some embodiments, the value of a single futures contract may be calculated as a constant dollar value (e.g., $50) times the number of variance points.

Although the foregoing formula is discussed with respect to a three-month variance future 14, it should be understood that variance future 14 may be a one-month futures contract, a six-month futures contract, or a futures contract based on any suitable time period.

Figure 3:
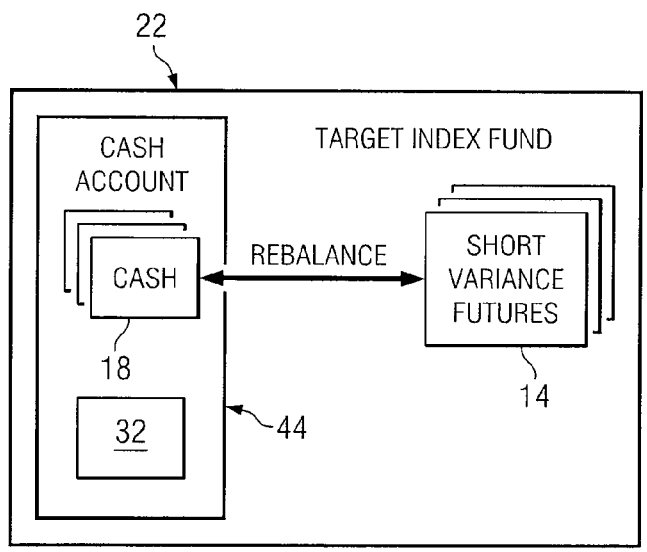
FIG. 3 illustrates an example target index fund, according to certain embodiments.

FIG. 3 illustrates an example target index fund 22, according to certain embodiments. Target index fund 22 may be a passively managed and publicly traded fund that is configured to track the performance of target index 12. In some embodiments, target index fund 22 comprises a cash account 44 associated with interest rate 32. Target index fund 22 may further comprise short positions in variance futures 14.

In some embodiments, cash account 44 is an interest-bearing account that holds cash 18 that represents the collateral position in target index 12. Cash 18 in cash account 44 of target index 12 may increase with the accrual of interest that is earned according to interest rate 32.

Target index fund 22 may further comprise short positions in variance futures 14. The returns of target index fund 22 may be based at least in part on the performance of variance futures 14. In some embodiments, the assets of target index fund 22 may be periodically re-allocated such that the value of cash account 44 equals the value of the short positions in variance futures 14. According to certain embodiments, the value of cash 18 in cash account 44 is reset on each final settlement day of variance future 14 to correspond to target index closing value 42 on that final settlement day. Resetting cash 18 in cash account 44 may comprise buying and/or selling variance futures 14 such that cash 18 equals target index closing value 42 on the final settlement day and/or equals the value of the short positions in variance futures 14 in target index fund 22. By resetting the value of cash 18 in cash account 44, target index fund 22 may periodically take into account gains or losses on the short positions in variance futures 14 in target index fund 22. Thus, target index fund 22 may, without active management, emulate the performance of an ongoing collateralized short position in variance futures 14. Target index fund 22 may thereby provide favorable returns with greater liquidity and transparency than various hedge funds.

Figure 4:
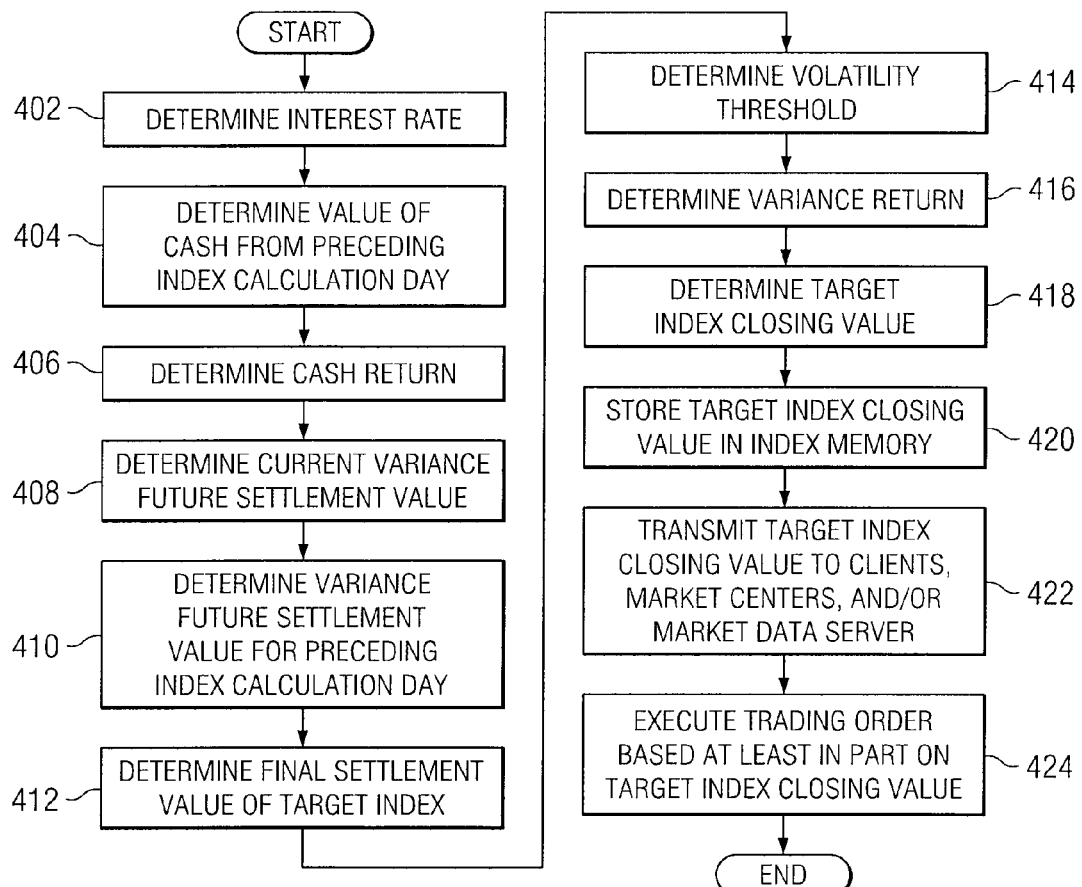
FIG. 4 illustrates a flowchart for updating a target index, according to certain embodiments.

FIG. 4 illustrates a flowchart for updating target index 12, according to certain embodiments. The method begins at step 402 where index server 30 determines interest rate 32. Index server 30 may determine interest rate 32 based at least in part on market data 28 from market data server 40. In some embodiments, interest rate 32 is an overnight lending rate for determining interest earned on cash 18 associated with target index 12. At step 404, index server 30 determines the value of cash 18 from the immediately preceding index calculation day. In some embodiments, index server 30 determines this value by scanning index memory 34, which may store historical values of cash 18 associated with target index 12. At step 406, index server 30 determines cash return 58 based at least in part on the determined interest rate 32 and on the determined value of cash 18 from the immediately preceding index calculation day. Index server 30 may store the determined cash return 58 in index memory 34.

At step 408, index server 30 determines variance future settlement value 38 for the current day. In some embodiments, index server 30 determines variance future settlement value 38 based at least in part on market data 28 from market data server 40. For a given day, variance future settlement value 38 may be determined as the average of one or more variance future transaction prices immediately before the close of trading. At step 410, index server 30 determines variance future settlement value 38 for the immediately preceding index calculation day. In some embodiments, index server 30 determines this value by scanning index memory 34, which may store historical variance future settlement values 38.

At step 412, index server 30 determines the final settlement value 64 of target index 12 for the most recent final settlement day of variance future 14. Final settlement value 64 of target index 12 refers to target index closing value 42 on the most recent final settlement day. Index memory 34 may store historical final settlement values 64 for target index 12. At step 414, index server 30 determines volatility threshold 66 associated with target index 12. Volatility threshold 66, which may be stored in index memory 34, may be based at least in part on historical values of realized volatility of variance future 14.

At step 416, index server 30 determines variance return 62 based at least in part on the current variance future settlement value 38, the variance future settlement value 38 from the immediately preceding index calculation day, the final settlement value 64 of target index 12 from the most recent final settlement day, and volatility threshold 66. At step 418, index server 30 determines target index closing value 42 for the current day based at least in part on the determined cash return 58, the determined variance return 62, and target index closing value 42 for the immediately preceding index calculation day.

At step 420, index stores the current target index closing value 42 in index memory 34. At step 422, index server 30 transmits the current target index closing value 42 to clients 20, market centers 50, and/or market data server 40. In some embodiments, index server 30 may cause GUIs 26 of clients 20 to display the current target index closing value 42 to traders 24. At step 424, market centers 50 may, based at least in part on the current target index closing value 42, execute one or more trading orders for instruments that are associated with target index 12. The method then ends.

Although the present invention has been described in detail, it should be understood the various changes, substitutions, and alterations can be made hereto without departing from the scope of the invention as defined by the appended claims.

What is claimed is:

1. A system, comprising:
   a memory operable to store a first closing value of an index for a first day, wherein the index is based at least in part on a cash account and a variance future;
   a processor communicatively coupled to the memory and operable to:

determine a first settlement value of a variance future for the first day;

determine a second settlement value of the variance future for a second day;

determine an increase of cash in the cash account from the first day to the second day, wherein the determination is based at least in part on an interest rate;

determine a second closing value of the index for the second day, wherein the determination is based at least in part on:
- the determined increase of cash in the cash account;
- the first settlement value; and
- the second settlement value;

and store the second closing value in the memory.

2. The system of claim 1, wherein the index emulates a collateralized short position in the variance future.

3. The system of claim 1, wherein:
the processor is further operable to determine a return associated with a variance future from the first day to the second day;
the determined return is based at least in part on:
- the first settlement value;
- the second settlement value; and
- a volatility threshold associated with the variance future;

and the determination of the second closing value is based at least in part on the determined return.

4. The system of claim 3, wherein the volatility threshold is based at least in part on one or more historical values of realized volatility of the variance future.

5. The system of claim 1, wherein, in conjunction with a final settlement day of the variance future, the processor is further operable to:
determine a closing value of the index; and
adjust the cash in the cash account to be substantially equal to the determined closing value.

6. The system of claim 1, wherein the variance future represents a CBOE S&P 500 Three-Month Variance Future.

7. The system of claim 1, wherein:
the cash account is held by a publicly traded fund that tracks the target index;
the fund maintains a short position in one or more variance futures; and
in conjunction with a final settlement day of the variance future, the processor is further operable to reset the cash account to be equal to a closing value of target index on the final settlement day.

8. The system of claim 1, wherein the interest rate is a BBA Overnight LIBOR rate.

9. The system of claim 1, wherein:
the processor is further operable to cause one or more client devices to display the second closing value; and
at least one client device is operable to submit a trading order associated with the index, wherein the trading order is based at least in part on the second closing value.

10. A method, comprising:
storing a first closing value of an index for a first day, wherein the index is based at least in part on a cash account and a variance future;
determining a first settlement value of a variance future for the first day;
determining a second settlement value of the variance future for a second day;
determining an increase of cash in the cash account from the first day to the second day, wherein the determination is based at least in part on an interest rate;
determining, with a processor, a second closing value of the index for the second day, wherein the determination is based at least in part on:
- the determined increase of cash in the cash account;
- the first settlement value; and
- the second settlement value;

and storing the second closing value in memory.

11. The method of claim 10, wherein the index emulates a collateralized short position in the variance future.

12. The method of claim 10, further comprising determining a return associated with a variance future from the first day to the second day, wherein:
the determined return is based at least in part on:
- the first settlement value;
- the second settlement value; and
- a volatility threshold associated with the variance future;

and the determination of the second closing value is based at least in part on the determined return.

13. The method of claim 12, wherein the volatility threshold is based at least in part on one or more historical values of realized volatility of the variance future.

14. The method of claim 10, further comprising, in conjunction with a final settlement day of the variance future:
determining a closing value of the index; and
adjusting the cash in the cash account to be substantially equal to the determined closing value.

15. The method of claim 10, wherein the variance future represents a CBOE S&P 500 Three-Month Variance Future.

16. The method of claim 10, wherein:
the cash account is held by a publicly traded fund that tracks the target index; and
the fund maintains a short position in one or more variance futures;
and further comprising:
in conjunction with a final settlement day of the variance future, resetting the cash account to be equal to a closing value of target index on the final settlement day.

17. The method of claim 10, wherein the interest rate is a BBA Overnight LIBOR rate.

18. The method of claim 10, further comprising:
causing one or more client devices to display the second closing value; and
executing a trade associated with the index, wherein the trade is executed based at least in part on the second closing value.

* * * * *